April 15, 1969  R. I. HODGE  3,439,194
ELECTRIC POWER GENERATING SYSTEM
Filed Feb. 19, 1965  Sheet 2 of 2

Inventor
Ronald I. Hodge
By Stevens, Davis, Miller & Mosher
Attorneys

United States Patent Office 3,439,194
Patented Apr. 15, 1969

3,439,194
ELECTRIC POWER GENERATING SYSTEM
Ronald I. Hodge, Deep River, Ontario, Canada, assignor to Atomic Energy of Canada Limited, Ottawa, Ontario, Canada, a corporation of Canada
Filed Feb. 19, 1965, Ser. No. 434,074
Int. Cl. H02k 45/00
U.S. Cl. 310—11    9 Claims This invention relates to a system for generating electric power by means including a magnetohydrodynamic generator.

The object of the present invention is to provide a system characterized by relative simplicity and improved efficiency over these factors as normally obtainable in magnetohydrodynamic systems.

One of the problems encountered in the past in magnetohydrodynamic generators has been to obtain a working fluid with sufficient electrical conductivity. The alkalimetals in vapor form represent most convenient materials for this purpose, largely because the alkali metals can be used in the Rankine cycle which is generally more convenient than the Joule cycle which must be used with other materials such as argon mixed with a small proportion of caesium, a mixture having better electrical conductivity. When an alkali metal is used the temperature of such material has to be raised to a very high value (far in excess of its boiling point) before the degree of ionization of the vapor resulting from its thermal agitation is sufficiently high to enable worthwhile currents to flow. The degree of ionization controls the conductivity of the fluid, which is a vital factor in the efficiency of the overall system.

The principal feature of the present invention is that the magnetohydrodynamic generator is placed in close proximity to a nuclear reactor, preferably a "fast" reactor, in such a way that the vapor stream across which the current is generated and in which an enhanced conductivity is desired is directly exposed to the gamma radiation from the reactor. The gamma radiation raises the degree of ionization significantly and renders the conductivity substantially better than has proved obtainable by thermal agitation alone. Moreover, it enables the process to be carried out at a much lower temperature than has hitherto been practicable. Thus, while the usually heavy shielding is placed around the reactor, and indeed around the entire system, no shielding is placed between the reactor and the magnetohydrodynamic generator, in order that full advantage may be taken of the gamma radiation of the reactor to enhance the ionization of the working fluid in the magnetohydrodynamic generator.

At the same time the reactor is used to heat the working fluid, the latter being supplied to the reactor in liquid form and discharged therefrom as the vapor needed in the magnetohydrodynamic generator. While a "fast" reactor is preferred due to its compact nature and ideal characteristics for the present purpose, a suitable thermal reactor can be employed, for example, a highly enriched compact thermal reactor.

An example of a system operating in accordance with the present invention is illustrated diagrammatically in the accompanying drawings, which latter are provided by way of example only and not by way of limitation of the invention, the scope of which is defined in the appended claims.

Figure 1:
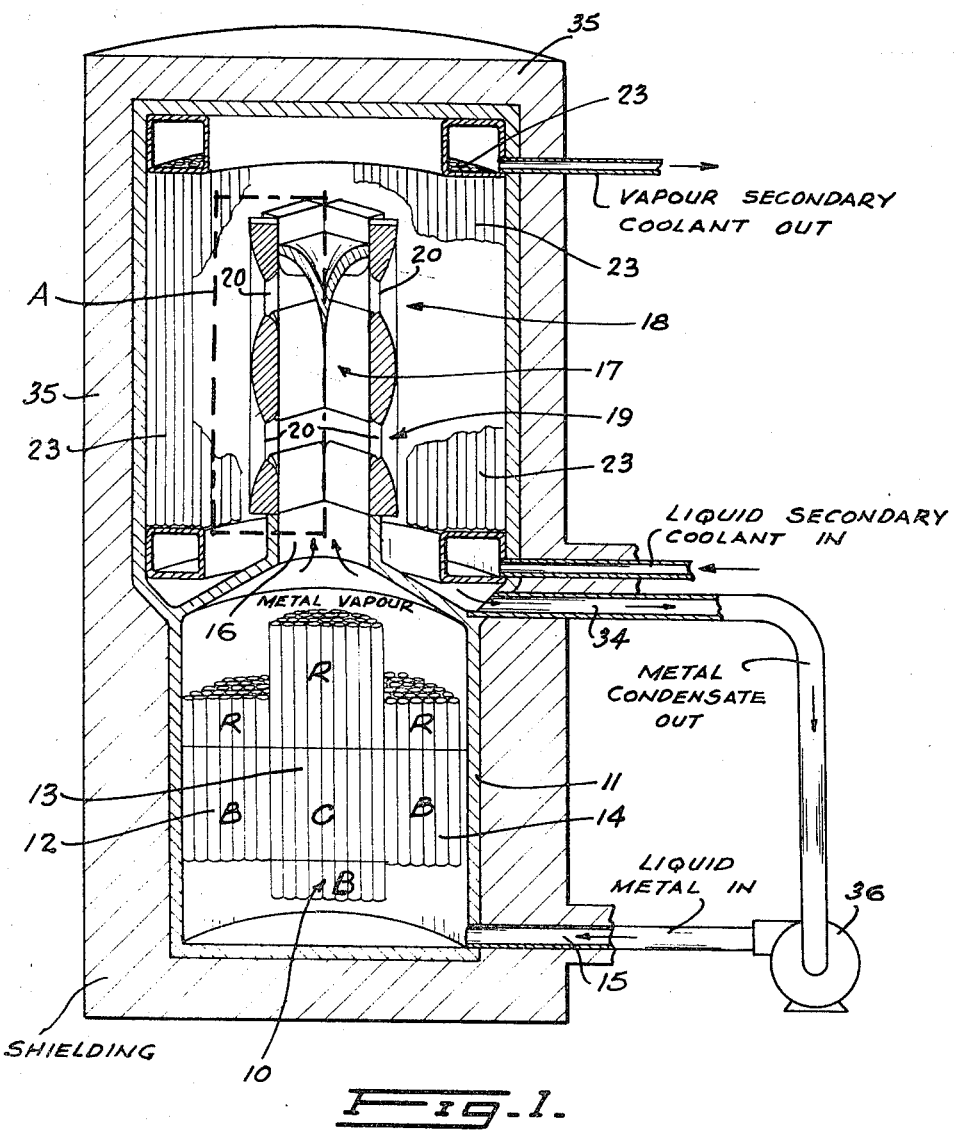
FIGURE 1 is a general, cross sectional, schematic view of the whole system.

The overall system shown in FIGURE 1 consists of a nuclear reactor 10 of the so-called "fast" type comprising a reactor vessel 11 containing the usual tightly packed mass of vertically extending fuel elements of which the elements 12, 13 and 14 are shown as typical examples. The arrangement of these elements is such as effectively to divide the reactor into zones B, C and R, where the zones B are the blanket zones comprising fertile material, where breeding occurs; the zone C comprises a core zone of fissile enriched material, from which the energy is derived; and the zones R comprise reservoirs for the fission gases that are evolved in the process. Such a fast reactor is conventional.

The coolant cycle of the reactor 10 comprises an intake 15 for receiving an alkali metal (e.g., potassium) in liquid form. This metal flows upwardly through the spaces between the fuel elements of the reactor and is finally discharged as metal vapor through a coolant output 16 at the top of the reactor. Assuming for the moment that the metal employed as the working fluid is potassium (the use of other metals will be discussed below), the temperature will be slightly higher than 774° C. (the boiling point of potassium at atmospheric pressure), since the pressure will be somewhat superatmospheric, for example between 1.5 and 2 atmospheres.

Figure 2:
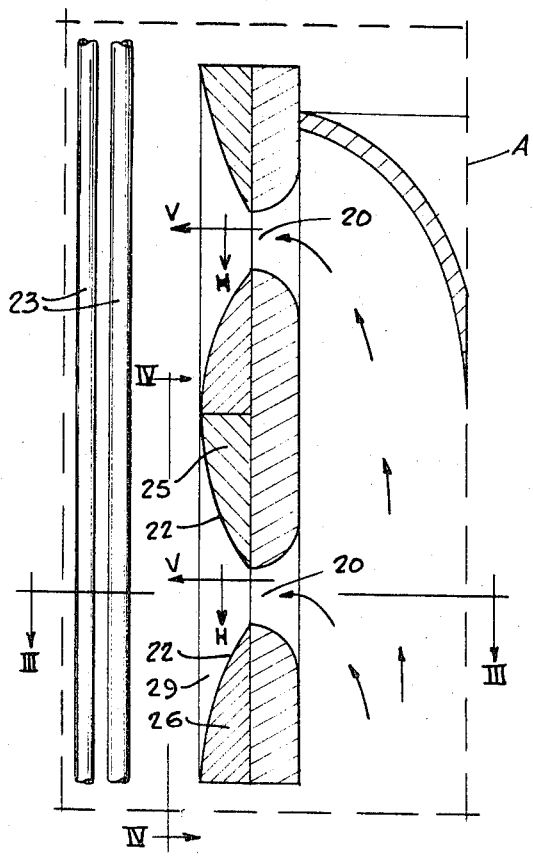
FIGURE 2 is a larger scale cross sectional view of a portion of the magnetohydrodynamic generator being the portion of FIGURE 1 shown within the broken rectangle A.
Figure 4:
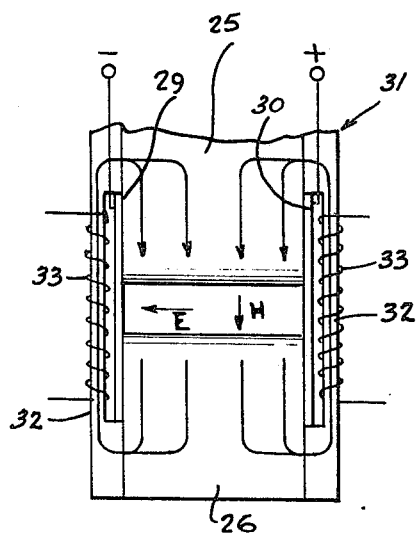
FIGURE 4 is a section on the line IV—IV in FIGURE 2.
Figure 3:
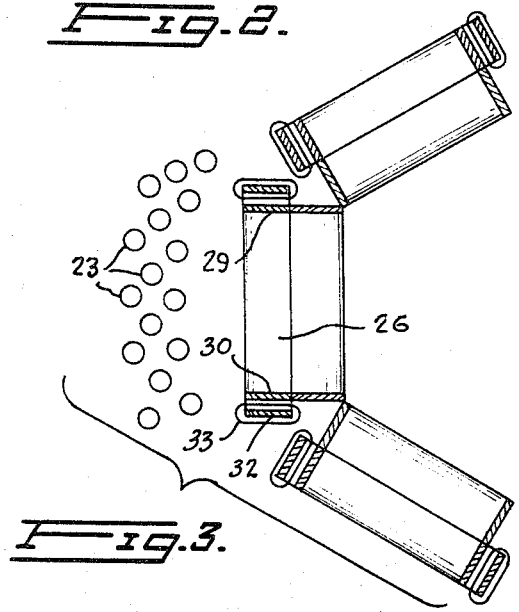
FIGURE 3 is a section on the line III—III in FIGURE 2.

The potassium vapor issuing from the top 16 of the reactor 10 passes to the magnetohydrodynamic generator which is shown generally at 17. Although any convenient number of nozzles may be employed in the generator 17, the example illustrated shows two tiers 18 and 19 arranged one above the other and each having six nozzles 20. For details of the generator 17 reference should now be made to FIGURES 2 to 4. Each nozzle 20 and its associated components being essentially the same, only one will be described in detail. In such a typical nozzle 20 the vapor is accelerated (i.e., expanded) to high velocity. Typically such acceleration may involve a pressure drop from 1.5 to 1.0 atmospheres. The vapor flow at high velocity then enters a magnetohydrodynamic generator channel 22 shaped to maintain constant velocity as the pressure falls from about 1.0 atmosphere to about 0.01 atmosphere, such lower pressure being maintained by condenser tubes 23 which condense the potassium vapor back to liquid potassium while extracting heat therefrom.

The generation of electricity follows the general principles of magnetohydrodynamic generation, magnetic pole pieces 25 and 26 on opposite sides of the channel 22 providing a magnetic field extending transversely across the direction of travel V of the high velocity expanding vapor stream. In the third direction, that is to say, in the direction transverse both to the stream direction V and the field H, a voltage E is generated and is collected by a pair of output electrodes 29 and 30. These electrodes have been shown simply as single electrodes on each side of the vapor stream, but they may in fact be segmented in accordance with known practice in magnetohydrodynamic generators, to take account of any voltage change in the flow direction of the vapor stream. The electricity generated across the various pairs of electrodes 29 and 30 will be collected by conventional conductors (not shown). The magnetic poles 25 and 26 form part of a magnetic circuit 31 having cores 32 wound with coils 33, as best appreciated from FIGURE 4.

The liquid condensate generated by the condenser tubes 23 flows out through a conduit 34 to be returned by a pump 36 to the intake 15 of the reactor coolant cycle. The secondary coolant in the condenser tubes 23 may be water, which is turned to steam, or it may be a secondary supply of liquid metal or organic fluid for extracting the heat and transmitting it to a conventional boiler (or heating plant) situated elsewhere.

The entire system is shielded in a conventional manner by heavy shielding 35 and the usual precautions are taken in relation to the fluids flowing in and out of the system. It is important, however that no shielding is placed between the reactor 10 and the generator 17, in order that the degree of ionization of the working vapor passing through the orifices 20 be increased by the gamma radiation from the reactor to a level that enables the system to operate with reasonable efficiency at the comparatively low temperatures employed.

The system described is ideally suited to operation in conjunction with a conventional thermal generating station. A relatively low temperature drop exists across the magnetohydrodynamic generator, so that the great majority of the heat produced in the reactor is made available in the secondary coolant heated in the condenser tubes 23. It is significant that this energy is available at a comparatively high temperature and can therefore be used with relatively high efficiency in a conventional thermal power plant. The electrical energy generated in the magnetohydrodynamic generator constitutes, in effect, a bonus of extra power, and will thus result in an enhanced overall efficiency for the combination of the thermal and magnetohydrodynamic generators. Merely by way of example, it is calculated that a reactor generating approximately 1,000 megawatts of thermal energy can be expected to generate about 150 megawatts of electrical energy in the magnetohydrodynamic generator, leaving about 850 megawatts of thermal energy to be passed to the thermal power plant at about 700° C.

Another application of the present invention is to the generation of electric power in special locations such as space vehicles. The thermal energy remaining downstream of the magnetohyhydrodynamic generator would be discarded in a space vehicle. The fact that this energy appears at a relatively high temperature facilitates its disposal by radiation. The disposal of waste heat is often a problem in space vehicles, since it can only be lost by radiation. Unless the temperature of the waste heat is comparatively high, the size of radiator required becomes unmanagably large.

Finally, returning to the matter of the choice of metal to use as the working fluid, it should be mentioned that sodium can be used in place of potassium. Of the two, potassium is somewhat preferred, because it has a lower dimer content. On the other hand, while potassium boils at about 774° C. sodium boils at about 892° C. (both at atmospheric pressure) which would enable the system cycle to operate at a slightly higher temperature. Caesium which boils at about 690° C. (at atmospheric pressure) could also be used as could lithium (1,317° C.) or rubidium (688° C.).

I claim:
1. A system for generating electric power comprising:
   (a) a fast nuclear reactor having a coolant cycle with an intake of liquid alkali metal and an output of said metal in vapor form,
   (b) a magnetohydrodynamic generator connected to receive said vapor at a first pressure, said generator including
      (i) nozzle means,
      (ii) means for passing said vapor through and beyond said nozzle means as an expanding stream,
      (iii) a condenser downstream of said nozzle means for condensing said vapor while extracting heat therefrom and maintaining a second pressure lower than said first pressure,
      (iv) means providing a magnetic field in a direction transverse to said stream,
      (v) and electrodes spaced apart from each other in the direction extending transversely of both said stream and said field,
   (c) and means for returning said condensed vapor to the intake of said coolant field,
   (d) said generator being located adjacent said reactor with said expanding stream exposed to gamma radiation from said reactor to raise the degree of ionization of said stream above its thermal equilibrium value.

2. A system for generating electric power comprising a nuclear reactor having an alkali metal coolant cycle discharging said metal as a vapor, and a magnetohydrodynamic generator receiving said vapor as a working fluid and having means for condensing said vapor and returning the condensate to said reactor coolant cycle, said generator being located adjacent said reactor with the working fluid thereof exposed to gamma radiation from said reactor to raise the degree of ionization of said fluid above its thermal equilibrium value.

3. A system according to claim 1, wherein said nozzle means comprises two tiers disposed one above the other, each tier having a plurality of circumferentially arranged nozzles, said nozzle being oriented to be traversed by said vapor stream in a horizontal direction, and wherein said means for providing a magnetic field comprises electric coils, one of said coils surrounding each of said nozzles.

4. A system according to claim 3, wherein each said tier comprises six nozzles.

5. A system according to claim 2, wherein said alkali metal is sodium.

6. A system according to claim 2, wherein said alkali metal is potassium.

7. A system according to claim 2, wherein said alkali metal is lithium.

8. A system according to claim 2, wherein said alkali metal is caesium.

9. A system according to claim 2, wherein said alkali metal is rubidium.

References Cited

UNITED STATES PATENTS

| 3,140,410 | 7/1964 | McLafferty | 310—11 |
| 3,149,248 | 9/1964 | Valfells | 310—11 |
| 3,234,411 | 2/1966 | Klein | 310—4 |
| 3,306,045 | 2/1967 | Buford | 60—203 |

J. D. MILLER, *Primary Examiner.*

DAVID X. SLINEY, *Assistant Examiner.*